T. MIDGLEY.
CLIP FOR BEAD WIRES.
APPLICATION FILED MAY 20, 1919.
1,368,642.
Patented Feb. 15, 1921.
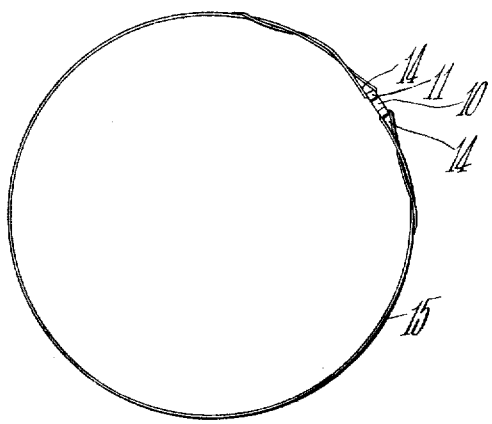
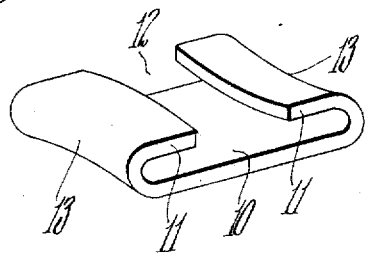

UNITED STATES PATENT OFFICE.

THOMAS MIDGLEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

CLIP FOR BEAD-WIRES.

1,368,642.  Specification of Letters Patent.  Patented Feb. 15, 1921.

Application filed May 20, 1919. Serial No. 298,535.

*To all whom it may concern:*

Be it known that I, THOMAS MIDGLEY, a citizen of the United States of America, residing at Springfield, in the county of Hampden and State of Massachusetts, have invented certain new and useful Improvements in Clips for Bead-Wires, of which the following is a specification.

My invention relates to a clip for fastening together the looped ends of an anchoring or retaining wire such as is used in the beads of automobile tire casings, particularly casings of the larger sizes. It has for its object the provision of a clip which will securely hold the anchoring wire under the tension which is exerted upon it in the tire casing. It also has for its object the provision of a clip which will take up but little room in the bead of the casing. It also has for its object the provision of a clip which will not bend or distort after having been placed in position. It also has other objects which will appear from the description and claims.

It is customary in building up automobile tire casings, particularly with casings of the larger size, to embed in the beads of the casings one or more anchoring or reinforcing wires which hold the plies of fabric or the layers of cords in place and which give solidity and inextensibility to the beads of the casing. These wires have usually been joined by twisting their ends together, as no clip had been devised which would hold the wires firmly while under the tension existing in actual use. The present clip has been developed to provide a clip which can be readily placed in position and which will thereafter firmly hold the anchoring wire. I have illustrated the preferred embodiment of this clip in the accompanying drawings, in which—

Figure 1 shows the clip in position uniting the ends of an anchoring wire;

Fig. 2 shows an enlarged perspective view of the clip.

The clip is preferably made of sheet metal and comprises a body portion 10 and folded over ends 11. A gap 12 is left between the ends 11 so that the loop of the anchoring wire may be readily inserted. In order to prevent the portions 11 being drawn out of place when the clip is subjected to tension the walls are preferably made externally concave as shown at 13, the interior of the folded over portion being, of course, convex. This not only fits the interior surface of clip to the loop of the anchoring wire, but it also gives an arch action which effectively prevents the folded ends 11 being drawn outwardly by the pull of the anchoring wires. In Fig. 1 the clip is shown in place uniting the two loops 14 at the ends of an anchoring wire 15 such as is used in the beads of large sized automobile tire casings.

I claim—

1. A clip having a substantially flat body portion and folded over end portions adapted to receive the loops of the ends of the anchoring wires used in automobile tire casings, said folded over portions presenting a convex inner surface and a concave outer surface whereby they are held against distortion when subjected to tension.

2. A sheet metal clip for retaining in place two opposed wire loops, comprising a flat portion, the ends of which are folded over adjacent to but spaced from the body portion, whereby a space for the reception of a loop of wire is left between the folded over portion and the flat portion; the folded portions being concave inwardly so as to present a convex surface to the loops of wire and giving an arch-like action to resist distortion; and a space being left between the adjacent ends of the folded over portions, so as to permit of the insertion into the clip of the loops of wire.

THOMAS MIDGLEY.